July 20, 1948.  W. LASAR  2,445,676
RECIPROCATING WORK TABLE FOR BAND SAWS WITH MEANS
FOR RETRACTING THE TABLE FROM THE CUTTING
PLANE AFTER EACH CUTTING STROKE
Filed Nov. 19, 1945
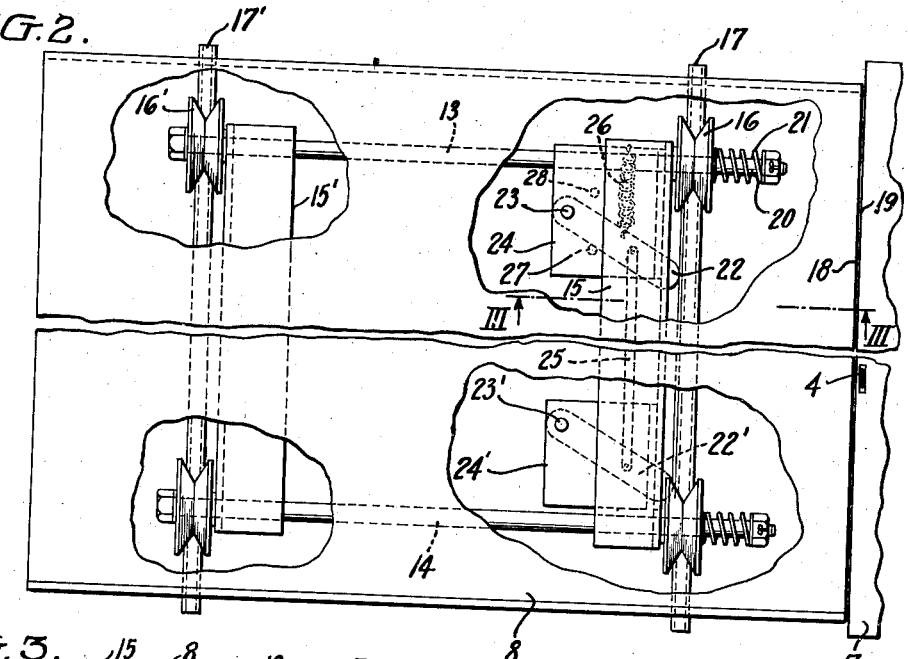
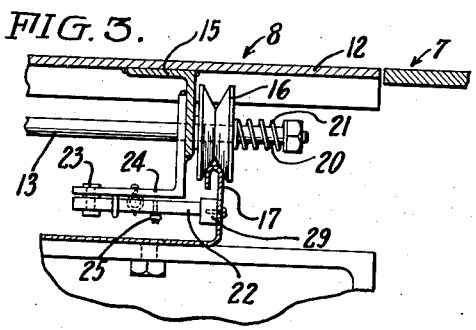
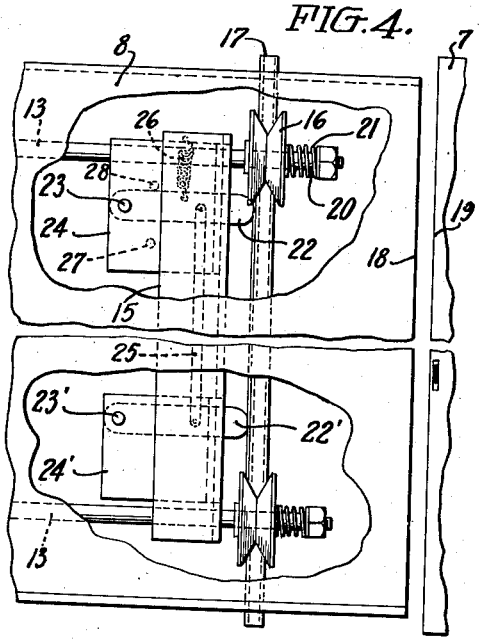
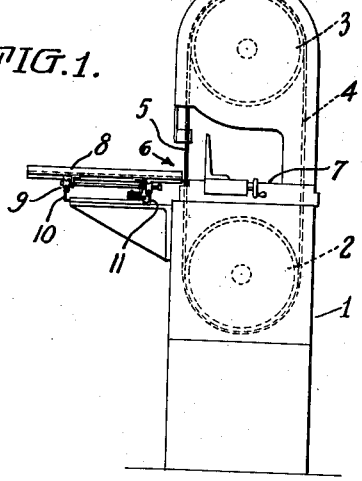
INVENTOR
WILLIAM LASAR.
BY
Harold E. Mattingly
ATTORNEY Patented July 20, 1948

2,445,676

UNITED STATES PATENT OFFICE 2,445,676

RECIPROCATING WORKTABLE FOR BAND SAWS WITH MEANS FOR RETRACTING THE TABLE FROM THE CUTTING PLANE AFTER EACH CUTTING STROKE

William Lasar, Los Angeles, Calif.

Application November 19, 1945, Serial No. 629,345

3 Claims. (Cl. 146—88)

My invention relates to band saws, and has particular reference to a work supporting table or carriage by which a work piece may be moved toward and away from the band of the saw.

In band saw operations it is a common practice to employ a work table at least a portion of which is mounted upon rollers to comprise a work supporting carriage by which the work piece may be moved toward the band saw for a cutting operation, and then be retracted for making a second cut. Such work tables are used especially in connection with band saws employed for the cutting of meats wherein a chunk of meat to be cut into a number of pieces or slices, is supported by the operator upon a movable work supporting carriage which is moved toward the band saw to make one cut. Upon retraction of the work supporting carriage and the piece of meat remaining thereon, it frequently occurs that the meat will strike the saw upon such a return movement, tending to displace the saw blade from its guides, but what is more important, there is a tendency for the piece of meat upon which the operator is holding his hand, to twist with the dangerous possibility of accidentally moving the hand of the operator into contact with the saw blade.

It is therefore an object of my invention to provide a band saw construction in which a movable work supporting table is mounted for reciprocating motion toward and past a saw blade, and which, upon retractive movement to position the parts ready for a second cut, the work table will shift laterally with respect to the saw blade to provide an adequate space between the work piece and the saw blade to avoid the danger of inadvertent contact therebetween.

Another object of my invention is to provide a work supporting carriage for band saws of the character described, wherein movement of the carriage in one direction is permitted with the carriage in close lateral juxtaposition with respect to the saw blade, but which, upon the initiation of a reactive movement of the carriage, automatically shifts the carriage laterally away from the saw blade and maintains the carriage in its laterally spaced relation during the entire reactive movement.

Another object of my invention is to provide a work supporting carriage for band saws of the character set forth, in which the shifting of the work table laterally, results automatically from the exertion of a force tending to draw the table backwardly with respect to the saw blade, and in which any movement of the carriage in the direction required for making of the cut, will automatically restore the carriage to its close lateral relation with respect to the saw blade.

Other objects of my invention will be apparent from a study of the following specifications read in connection with the accompanying drawings wherein:

Fig. 1 is a front elevational view of the band saw assembly embodying the principles of my invention;

Fig. 2 is a top plan view of a portion of the band saw assembly shown in Fig. 1, portions of the work supporting table being broken away to permit viewing of the track and carriage mounting employed;

Fig. 3 is a fragmentary vertical sectional view taken along the line III—III of Fig. 2; and Fig. 4 is a fragmentary top plan view similar to Fig. 2, but illustrating the position of the work supporting table during the reactive movement thereof.

Referring to the drawings, I have illustrated a band saw assembly comprising a suitable frame 1 for supporting a pair of spaced pulleys 2 and 3 over which is trained an endless band saw blade 4. The band saw blade 4 is enclosed throughout the major portion of its length by the frame 1, a short portion of the blade being exposed as indicated at 5 immediately above a work table indicated generally at 6. The work table 6 comprises a stationary portion 7 fixed to the frame 1 of the saw assembly, while another portion 8 of the work table is constructed as a work supporting plate mounted upon a plurality of wheels 9 engaging a pair of spaced tracks 10 and 11 extending lengthwise of the frame 1 of the saw assembly, so that work pieces supported upon the movable table 8 may be moved toward the exposed portion 5 of the saw blade to cause the saw blade to make a cut through the work piece and then the movable table 8 is retracted past the blade to enable the operator to again move the work piece toward the saw blade to make a second and other additional cuts.

The movable table 8 is illustrated as comprising a substantially flat plate 12 of rectangular shape having a pair of shafts 13 and 14 extending transversely immediately below the plate, one of the shafts 13 being disposed adjacent the rearward end of the plate 12 while the other shaft 14 is disposed adjacent the forward end of the plate as the plate is viewed from the front of the frame 1 of the saw assembly. Each of the shafts is supported beneath the plate 12 by a pair of bearing members 15 which may be of any suitable construction, though I prefer to employ a pair of lengths of angle iron 15 and 15' welded or otherwise secured to the under surface of the plate 12 to extend in parallel laterally spaced relation to each other. The angle iron bearing members 15 and 15' therefore constitute bearings for both of the shafts 13 and 14.

Upon the shaft 13 I mount a pair of wheels 16 and 16', one adjacent each end of the shaft 13 to engage respectively, a pair of tracks 17 and 17' formed upon or secured to a table supporting structure, the tracks extending in parallel spaced relation to each other lengthwise of the frame 1 of the saw assembly.

The wheels 16 are preferably grooved wheels into the grooves of which the track members 17 and 17' will seat to hold the table 8 against inadverent lateral displacement relative to the stationary portion 7 of the work table of the saw assembly.

With the construction thus far described, the side edge 18 of the movable work table 8 is disposed in close lateral relation with the edge 19 of the stationary work table 7, so that the edge 18 of the movable work table may be moved toward the toothed edge of the saw blade and will be guided by the wheels and tracks to move a work piece toward and past the saw blade to make a cut therethrough.

Upon retracting the work table 8 to restore the carriage to a forward position ready for the making of a subsequent cut, the work piece which has been supported upon the work table 8, will be drawn back past the saw blade 4, and in order to avoid the possibility of the work piece inadvertently striking the saw blade during this backward or retractive movement, I provide a mechanism for automatically shifting the work table 8 to the left as viewed in the drawings, to widen the space between the edge 18 of the movable work table and the side of the saw blade 4.

This may be readily accomplished by mounting the wheels 16 and 16' for lateral shifting movement upon the shafts 13 and 14 as by loosely mounting the wheels upon the shaft and providing a length of shaft 20 extending beyond the right-hand wheels 16. The shafts are normally urged to the left with respect to the wheels 16 and 16' by means of a spring 21 surrounding the extending end 20 of the shaft, requiring the compression of the spring when the shaft 20 is to be shifted from its normal position shown in Fig. 2 to a left-hand position as shown in Fig. 4.

To accomplish the lateral shifting of the carriage 8, I provide a lever 22 pivoted as at 23 upon a suitable supporting bracket 24 preferably mounted upon the angle iron bearing member 15, the lever 22 being normally disposed in an acute angle to the track member 17 with its free end engageable with and slidable along a portion of the track 17, or upon a wear strip 29 secured upon the inner side of the track member 17. The free end of the lever 22 should engage the track 17 forwardly of the pivot point 23 as viewed by an operator standing in front of the machine, so that during a rearward movement of the carriage while performing a cutting operation, the free end of the lever 22 will freely slide along the track 17 without exerting any substantial lateral force upon the carriage.

However, as the carriage is drawn forwardly, that is, in a returning movement toward the operator, the free end of the lever 22 will so frictionally engage the track 17 or wear strip 29 as to be pivoted upon the pivot 23, tending to swing the lever 22 to a position at right angles to the track 17, as indicated in Fig. 4. When this occurs, a force will be exerted by the lever 22, positively shifting the carriage 8 laterally away from the plane of movement of the saw blade 5, the springs 21 on the shafts 13 and 14 being compressed to permit lateral shifting of the carriage while the wheels 16 and 16' remain in engagement with their respective tracks 17 and 17'.

Thus, upon the return movement of the carriage, a piece of meat or other work piece which has been held by the operator upon the carriage during the cutting operation, will be shifted laterally with the carriage to provide a substantial space between the edge of the work piece and the plane of movement of the saw blade, and positively preventing any inadvertent contact between the work piece and the saw blade during this return movement. To insure that both ends of the carriage will be shifted laterally an equal amount, it is advisable to provide a second lever 22' pivoted at 23' on a bracket 24' located immediately adjacent the shaft 14. The second lever 22 may then be interconnected by means of a link 25 with the lever 22, so that as the lever 22 shifts its position, the lever 22' will also be shifted and a two-point lateral thrust will be exerted on the carriage, positively holding both ends of the carriage in laterally spaced relation to the plane of movement of the saw blade.

In order to insure the exertion of a sufficient amount of friction between the free ends of the levers 22 and 22' and the track 17, to cause the levers to shift their position when the carriage is moved forwardly on its return motion but without exerting undue wear friction between the levers and the track on the rearward movement of the carriage, a spring 26 may be provided interengaging the bracket 24 and the lever 22 to normally exert a force tending to move the lever 22 to its shifted position. The strength of the spring 26 may be selected in conformity with the amount of friction which is required between the free ends of the lever and the track 17, to insure the shifting operation against the force of the springs 21 surrounding the shafts 13 and 14.

Stop pins 27 and 28 may be provided on the bracket 24 to limit the swinging movement of the lever 22 from its normal position as shown in Fig. 2, to its shifted position as shown in Fig. 4.

It will be apparent from the foregoing that I have provided a carriage mounting which will readily permit the lateral shifting of the carriage from a position disposing the edge of the carriage relatively close to the plane of movement of the saw blade, as the carriage is moved toward the saw blade making a cut into a shifted position spacing the edge of the carriage away from the saw blade when the carriage is moved in a direction to return a work piece past the blade preparatory to making another cut. It should be noted particularly that the shifting of the carriage into spaced relation relative to the saw blade, will occur instantly upon starting of the return movement of the carriage, no matter at what point along the path of movement of the carriage the return motion is started. Also, that the shifting of the carriage back toward the saw blade will occur instantly upon the re-starting of the carriage in its forward or cut performing operation again, irrespective of at what point along the path of movement of the carriage such re-starting takes place. Thus, the operation of the shifting mechanism is wholly independent of any conscious operation on the part of the operator.

With the carriage constructed in accordance with my invention, the danger of a work piece inadvertently striking the saw blade upon return movement of the carriage is materially reduced, and the safety of operation of band saws is thereby greatly enhanced.

While I have illustrated the application of my invention particularly with reference to a band saw, it will be apparent that the same carriage operation could be readily adapted to circular saws, or to any other cutting tools in which the work piece is carried upon a carriage adapted to travel along a track toward and away from the blade.

While I have shown and described the preferred embodiment of the invention, I do not desire to be limited to any of the details illustrated or described herein except as defined in the appended claims.

I claim:

1. A cutting machine comprising a cutting blade having a fixed location, a carriage for supporting a workpiece and movable on a selected path past the cutting blade, wheels on the carriage having a relative motion with respect to the carriage along a line at a large angle to the selected path, resilient means normally urging the table toward the cutter blade, a member extending parallel to the selected path, a lever pivoted to the carriage and having a length greater than the shortest distance from its pivot to the member, and resilient means urging the lever into contact with the member, whereby movement of the carriage in one direction along the path will cause the lever to drag against the member at an acute angle, and movement of the carriage in the other direction along the path will cause the lever to frictionally engage the member and move the carriage along the line of the relative motion of the wheels.

2. A cutting machine comprising a cutting blade having a fixed location, parallel tracks disposed adjacent to the blade, a platform, shafts on the platform disposed at right angles to the tracks, wheels disposed on the shafts for rotation and sliding thereon and adapted to engage the tracks for movement of the platform therealong, resilient means for maintaining the wheels in a normal position along the shafts but permitting sliding of the wheels on the shaft to shift the carriage away from the blade, a pivot on the platform, a lever secured to the pivot and greater in length than the shortest distance from the pivot to an adjacent track, resilient means urging the lever into frictional engagement with the adjoining track so that the engaging end is disposed toward the blade, and stops for limiting the rotation of the lever in one direction to a position substantially perpendicular to the track that it engages, whereby reverse movement of the carriage will cause the lever to frictionally engage the track to rotate against its stop and thereby shift the carriage relative to its wheels so that the blade may be cleared, and upon forward movement the lever will rotate to a normal position and the resilient wheel means will return the wheels to a normal position on the shafts.

3. A cutting machine comprising a cutting blade having a fixed location, parallel tracks disposed adjacent and to one side of the plane of the blade, a platform mounted for reciprocation on the tracks, shafts on the platform disposed at right angles to the tracks, wheels disposed on the shafts for rotation and sliding movements thereon and adapted to engage the tracks for movement of the platform therealong, resilient means for urging the wheels axially in a normal position along the shafts, pivots fixedly located on the platform, parallel equal length levers secured to the pivots and greater in length than the shortest distance from either pivot to an adjacent track, additional resilient means of substantially less strength than the first resilient means for urging the levers in the same direction into engagement with the adjacent track, stops fixed on the platform for limiting the rotation of the levers in one direction to a position substantially perpendicular to the track that it engages to space the platform away from the knife plane when the platform is moved in one direction, and additional stops fixed on the platform to prevent the platform from being moved by the first resilient means into the cutting plane when the platform is moved in the opposite direction.

WILLIAM LASAR.

REFERENCES CITED

The following references are of record in the file of this patent:

UNITED STATES PATENTS

| Number | Name | Date |
| --- | --- | --- |
| 1,793,461 | Biro | Feb. 24, 1931 |
| 2,075,545 | Reussenzehn | Mar. 30, 1937 |
| 2,075,554 | Strachan | Mar. 30, 1937 |
| 2,305,177 | Litty | Dec. 15, 1942 |

FOREIGN PATENTS

| Number | Country | Date |
| --- | --- | --- |
| 28,113 | Great Britain | Mar. 13, 1913 |